(12) United States Patent
Osako

(10) Patent No.: US 8,057,312 B2
(45) Date of Patent: Nov. 15, 2011

(54) TRIPOD CONSTANT-VELOCITY JOINT

(75) Inventor: Shunta Osako, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 12/527,278

(22) PCT Filed: Nov. 28, 2007

(86) PCT No.: PCT/JP2007/072978
§ 371 (c)(1),
(2), (4) Date: Aug. 14, 2009

(87) PCT Pub. No.: WO2008/105124
PCT Pub. Date: Sep. 4, 2008

(65) Prior Publication Data
US 2010/0029393 A1 Feb. 4, 2010

(30) Foreign Application Priority Data
Feb. 28, 2007 (JP) ................. 2007-049635

(51) Int. Cl.
*F16D 3/26* (2006.01)
(52) U.S. Cl. ......... 464/111; 464/132; 464/905; 384/571
(58) Field of Classification Search ......... 464/111, 464/120–123, 125, 132, 905; 384/564, 565, 384/571
See application file for complete search history.

(56) References Cited

U.S. PATENT DOCUMENTS

| 3,667,822 | A | * | 6/1972 | Armstrong | 384/565 |
| 4,886,479 | A | * | 12/1989 | Richtmeyer et al. | 464/111 |
| 5,788,577 | A | * | 8/1998 | Kadota et al. | 464/111 |
| 6,837,794 | B1 | | 1/2005 | Goto et al. | |
| 7,048,445 | B2 | * | 5/2006 | Torisawa | 384/565 |
| 7,083,522 | B2 | * | 8/2006 | Bongartz | 464/111 |
| 2005/0058381 | A1 | * | 3/2005 | Kiyo | 384/565 |
| 2006/0013520 | A1 | * | 1/2006 | Tamada et al. | 384/565 |
| 2006/0211502 | A1 | * | 9/2006 | Kawakatsu et al. | 464/111 |
| 2006/0293105 | A1 | * | 12/2006 | Kawakatsu et al. | 464/111 |
| 2007/0105633 | A1 | * | 5/2007 | Nakao et al. | 464/111 |
| 2008/0096676 | A1 | * | 4/2008 | Kawakatsu et al. | 464/111 |
| 2008/0311998 | A1 | * | 12/2008 | Nakao et al. | 464/111 |

FOREIGN PATENT DOCUMENTS

| DE | 102005061179 | * | 6/2007 | |
| JP | 04-049232 | | 4/1992 | |
| JP | 05149328 | * | 6/1993 | 384/565 |
| JP | 10-184717 | | 7/1998 | |
| JP | 11-210776 | | 8/1999 | |
| JP | 2004-176763 | | 6/2004 | |
| JP | 2005-249148 | * | 9/2005 | |

* cited by examiner

*Primary Examiner* — Gregory Binda
*Assistant Examiner* — Josh Skroupa
(74) *Attorney, Agent, or Firm* — Squire, Sanders & Dempsey (US) LLP

(57) ABSTRACT

A needle bearing functioning as a rolling element comprises a uniform-diameter body part and bottom surfaces shaped in flat surfaces. A tapered reduced-diameter part and a chamfered part are interposed between the body part and the bottom surface. A gentle reduction in diameter is first made by the tapered reduced-diameter part, and then a relatively sharp reduction in diameter is made by the chamfered part. Consequently, in the needle bearings adjacent to each other, their tapered reduced-diameter parts are separated from each other.

2 Claims, 11 Drawing Sheets

δ : CIRCUMFERENTIAL GAP
X : DISTANCE BY WHICH NEEDLE
    BEARING IS RADIALLY MOVED

FIG. 10

| 100 × (W/Dn) [%] | 0 | 5 | 10 | 15 | 20 | 25 | 30 | 35 | 40 | 45 | 50 | 55 |
|---|---|---|---|---|---|---|---|---|---|---|---|---|
| MACHINABILITY | ○ | ○ | ○ | ○ | ○ | ○ | ○ | △ | △ | △ | △ | △ |
| DURABILITY | ○ | ○ | ○ | ○ | ○ | ○ | ○ | ○ | ○ | ○ | ○ | ○ |
| RESISTANCE TO ROTATION | ○ | ○ | ○ | ○ | ○ | ○ | ○ | △ | △ | △ | △ | △ |

TRIPOD CONSTANT-VELOCITY JOINT

TECHNICAL FIELD

The present invention relates to a tripod constant-velocity joint for coupling a transmission shaft to another transmission shaft in a drive force transmitting mechanism for automobiles, for example.

BACKGROUND ART

Automobiles include a drive force transmitting mechanism, which incorporates therein a constant-velocity joint for transmitting the rotational drive force of a drive shaft from a driven shaft to axles. The drive force transmitting mechanism includes, for example, a tripod constant-velocity joint interposed between the drive shaft and the driven shaft, which is capable of transmitting rotation at a constant velocity even when an angle is formed between the drive shaft and the driven shaft.

The tripod constant-velocity joint includes an outer member comprising a shank and a tubular member. The drive shaft is coupled to the shank, and an inner member is fitted over the distal end of the driven shaft and inserted into the tubular member. The tubular member has a plurality of guide grooves defined in an inner wall surface thereof at equally spaced intervals. Each of the guide grooves is defined by a bottom surface and two side walls rising substantially perpendicularly from the bottom surface.

The inner member has an annular portion and a plurality of trunnions projecting from an outer circumferential wall of the annular portion. The trunnions are disposed in facing relation to the respective guide grooves. Substantially annular rollers are rotatably fitted over the respective trunnions, with needle bearings (rolling bodies) interposed therebetween. When the rollers are inserted respectively into the guide grooves, the drive shaft and the driven shaft become coupled to each other. Since the circumferential side walls of the rollers are held in sliding contact with the side walls of the guide grooves, the driven shaft displaces the outer member.

Ordinary needle bearings have a main portion in the form of a constant-diameter cylindrical body, and a distal end portion leading to the main portion. The distal end portion has an arcuately curved cross-sectional shape (see, for example, Patent Document 1, FIG. 6). If a flange is provided on the inner circumferential wall of each of the rollers to accommodate a needle bearing, then a machining cutter for the rollers may become quickly deteriorated, and it is not easy to accommodate the needle bearing within the roller. According to Patent Document 1, it has been proposed to make both bottom surfaces of the needle bearing flat.

Patent Document 1: Japanese Laid-Open Patent Publication No. 2004-176763

DISCLOSURE OF THE INVENTION

When the rollers are held in sliding contact with the guide grooves (the side walls), the rollers rotate. Since the rollers rotate, the needles of the needle bearings, and the needles of the needle bearings and inner walls of the flanges of the rollers are held in sliding contact with each other. Therefore, the needle bearings tend to wear out, even though the bottom surfaces thereof are flat as disclosed in Patent Document 1.

It is a major object of the present invention to provide a tripod constant-velocity joint, which keeps the needle bearings thereof free of undue wear.

According to an embodiment of the present invention, there is provided a tripod constant-velocity joint having a tubular outer member including three guide grooves defined in an inner wall thereof, the guide grooves being spaced a predetermined distance from each other and extending in axial directions, the tubular outer member being coupled to a first transmission shaft, and an inner member inserted in a hollow space inside the outer member and coupled to a second transmission shaft, comprising:

a plurality of trunnions disposed on the inner member and projecting into the guide grooves;

rollers having outer circumferential surfaces held in contact with side walls of the guide grooves of the outer member, the rollers being rotatable along the side walls; and a plurality of rolling bodies having flat bottom surfaces and interposed between the rollers and the trunnions, wherein each of the rolling bodies has a tapered reduced-diameter portion and a beveled surface, which are interposed between a constant-diameter main portion and the bottom surface, the beveled surface having a greater diameter reducing rate than the tapered reduced-diameter portion.

When the rollers rotate, the main portions of adjacent rolling bodies are held in sliding contact with each other, whereas the tapered reduced-diameter portions thereof are spaced from each other. Stated otherwise, according to the present invention, the area of sliding contact between the rolling bodies is small.

For the same reason, the area of sliding contact between the rolling bodies and the rollers, as well as the area of sliding contact between the rolling bodies and the trunnions, also is small. Therefore, it is possible to reduce the amount of wear on the rolling bodies. In other words, the tapered reduced-diameter portions prevent the rolling bodies from becoming unduly worn.

As described above, the rolling bodies have tapered reduced-diameter portions contiguous to the main portions, and the tapered reduced-diameter portions of adjacent rolling bodies are spaced from each other. When the rollers that hold the rolling bodies rotate, the area of contact between the rolling bodies, the area of contact between the rolling bodies and the rollers, and the area of contact between the rolling bodies and the trunnions are reduced. Therefore, the rolling bodies are prevented from becoming unduly worn.

In the tripod constant-velocity joint, if the width of contact between a rolling body holder of the rollers and an end face of the rolling bodies is represented by W, whereas the outside diameter of the rolling bodies is represented by Dn, then it is preferable to set the ratio of the outside diameter Dn of the rolling bodies to the width of contact W to a value ranging from 0 to 0.3. This ratio setting makes it possible to machine and assemble the parts with ease, while also reducing the resistance to rotation of the rollers.

BRIEF DESCRIPTION OF THE DRAWINGS

FIG. 10 is a table showing whether various characteristics are adequate or not, when a ratio (W/Dn) of an outside diameter Dn of a rolling body to a width of contact W is changed.

BEST MODE FOR CARRYING OUT THE INVENTION

A tripod constant-velocity joint according to a preferred embodiment of the present invention will be described in detail below with reference to the accompanying drawings.

Figure 1:
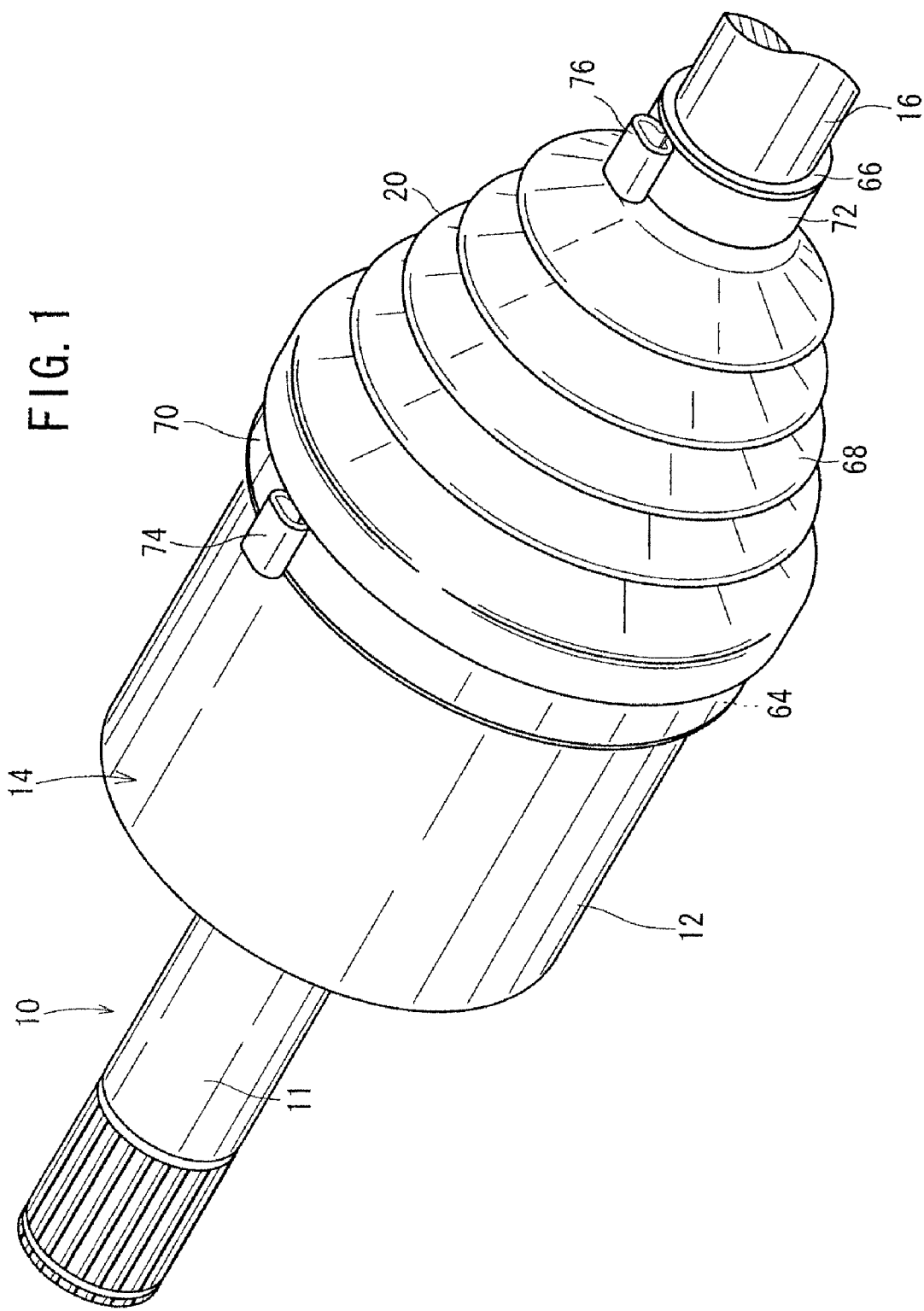
FIG. 1 is a fragmentary schematic perspective view of a drive force transmitting mechanism incorporating a tripod constant-velocity joint according to an embodiment of the present invention.
Figure 2:
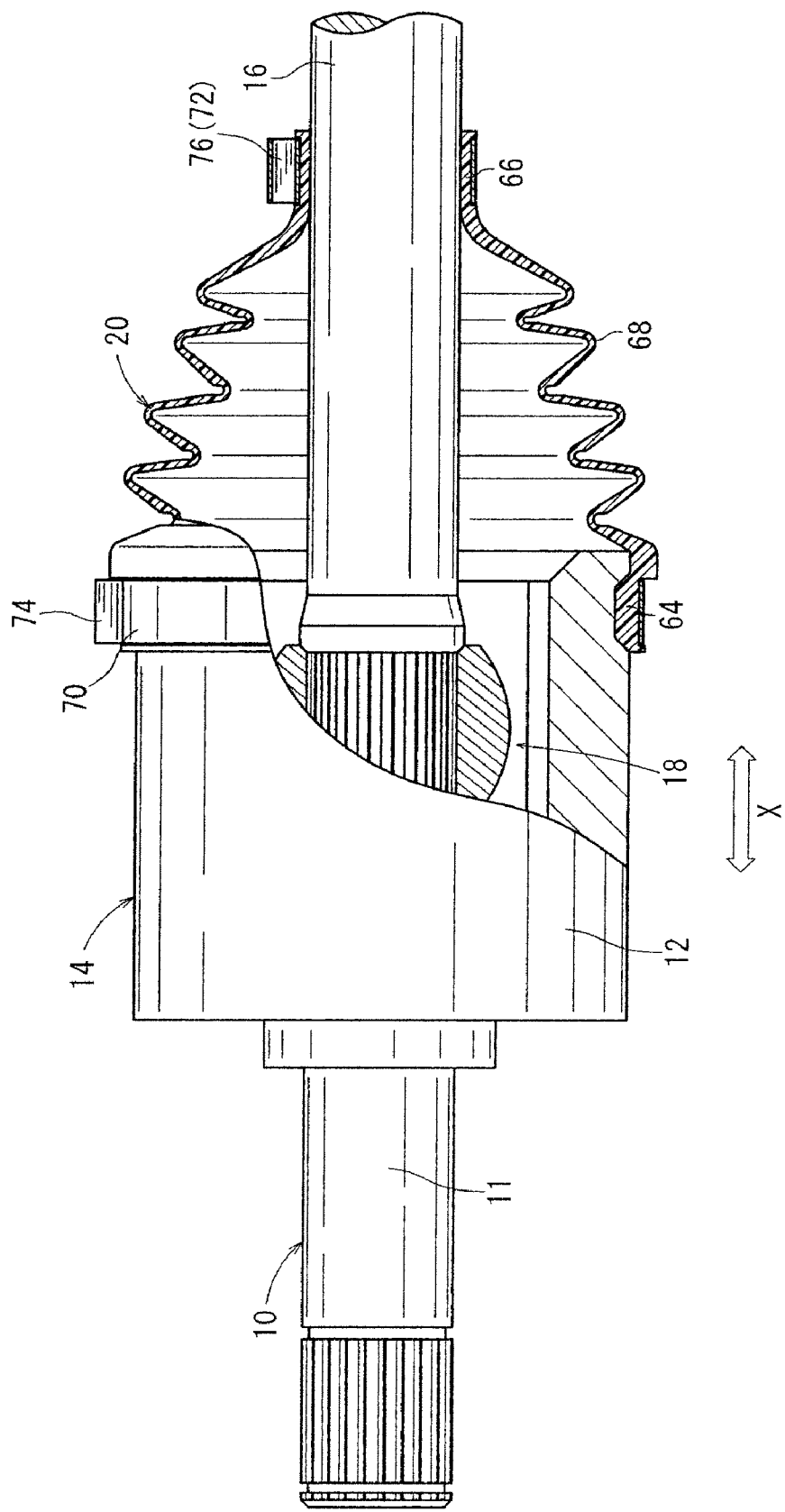
FIG. 2 is a side elevational view, partially cut away, of the constant-velocity joint shown in FIG. 1.

FIG. 1 is a fragmentary schematic perspective view of a drive force transmitting mechanism incorporating a tripod constant-velocity joint 10 according to an embodiment of the present invention, and FIG. 2 is a side elevational view, partially cut away, of the constant-velocity joint. The tripod constant-velocity joint 10 comprises an outer member 14 having a shank 11 coupled to a drive shaft (first transmission shaft), not shown, and a bottomed tubular member 12, and a spider 18 (see FIG. 2) serving as an inner member fitted over an end of a second transmission shaft 16 that serves as a driven shaft and inserted in the bottomed tubular member 12. An end of the outer member 14 and the second transmission shaft 16 are covered with a joint boot 20. An inner space of the joint boot 20 is filled with a grease composition.

Figure 3:
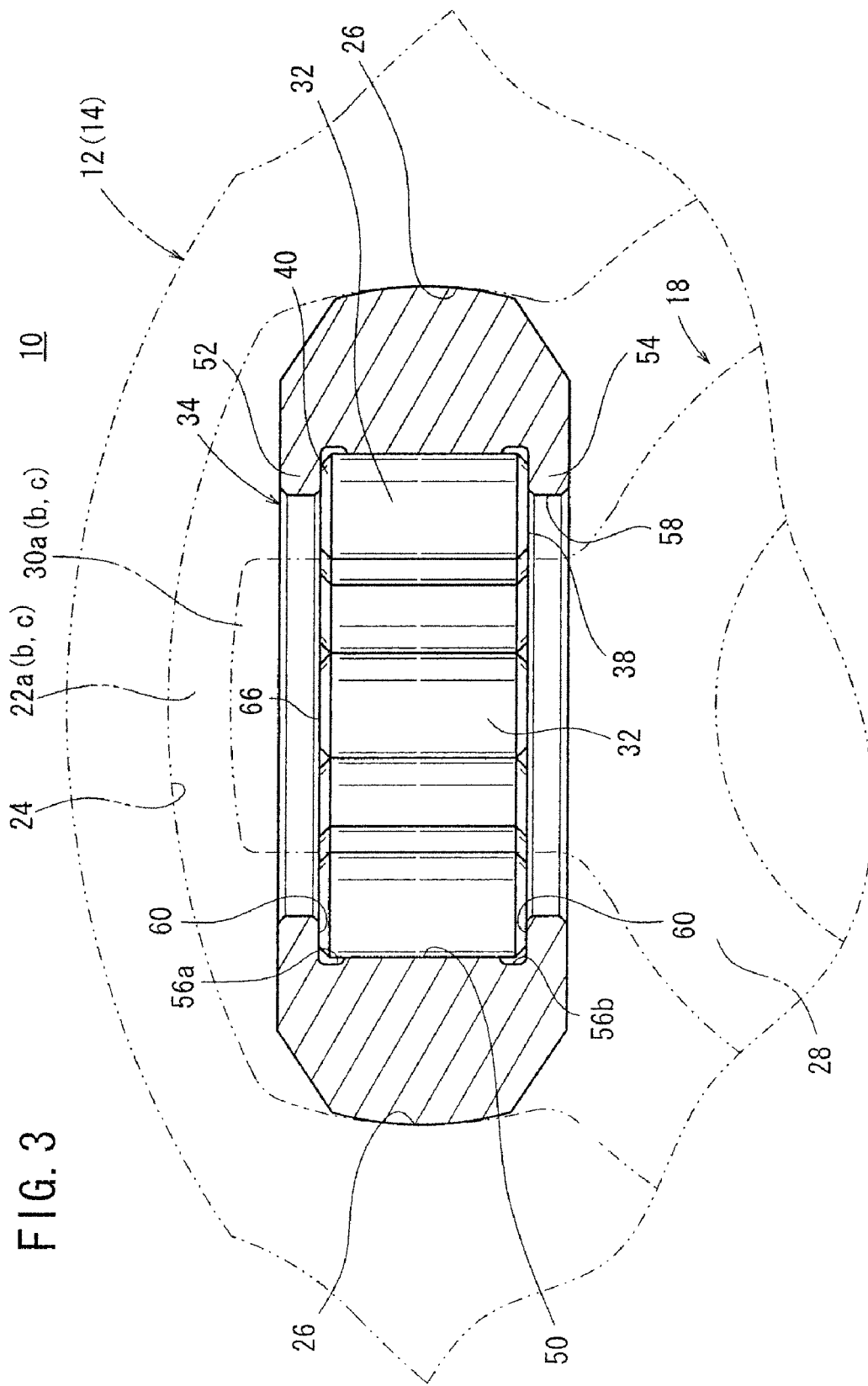
FIG. 3 is an enlarged front elevational view of a roller and a needle bearing of the constant-velocity joint shown in FIG. 1.
Figure 4:
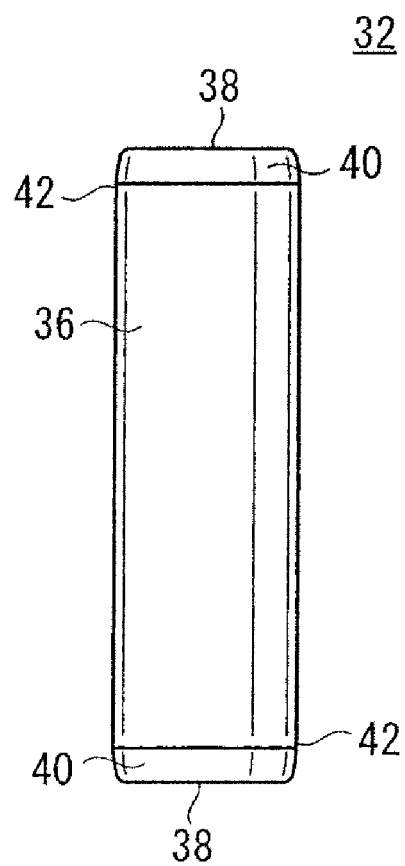
FIG. 4 is a schematic front elevational view of the needle bearing shown in FIG. 3.

As shown in FIGS. 3 and 4, the bottomed tubular member 12 of the outer member 14 has three guide grooves 22a through 22c defined in an inner wall surface thereof, the guide grooves 22a through 22c extending in axial directions of the outer member 14 and being spaced 120° from each other. Each of the guide grooves 22a through 22c is defined by a bottom surface 24 extending along an outer circumferential surface of the bottomed tubular member 12, and two side walls 26 rising substantially perpendicularly from the bottom surface 24.

The spider 18, which is coupled to the distal end of the second transmission shaft 16, is inserted into a hollow space in the bottomed tubular member 12 (see FIG. 2). As shown in FIG. 3, which fragmentarily illustrates a front side of the spider 18, the spider 18 has three integral trunnions 30a through 30c that project from an annular portion 28 into the respective guide grooves 22a through 22c. The trunnions 30a through 30c are spaced 120° from each other.

Rollers 34 are fitted over side walls of the trunnions 30a through 30c, with a plurality of needle bearings 32 interposed therebetween. The needle bearings 32 are substantially identical in shape and dimension to each other, and are tentatively held within the rollers 34 by means of a keystone process.

Figure 5:
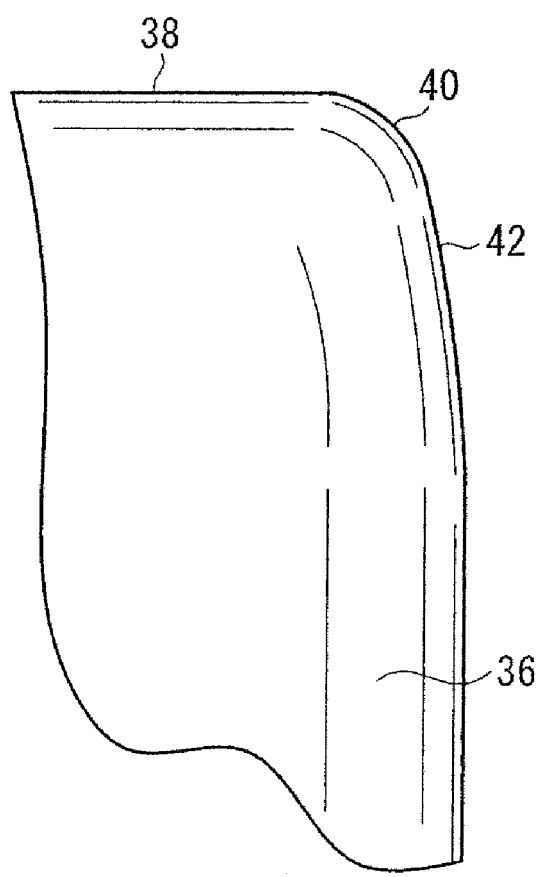
FIG. 5 is an enlarged fragmentary front elevational view of the needle bearing shown in FIG. 3.

As shown in FIG. 4, each of the needle bearings 32 has a constant-diameter main portion 36 and bottom surfaces 38, 38 formed as flat surfaces. The main portion 36 is in the form of a cylindrical body. In FIG. 5, reference numeral 40 represents a beveled surface. The beveled surface 40 may be of a conical shape or a spindle-like shaft, the end of which is cut off.

A portion of the needle bearing 32 near the beveled surface 40 is shown at an enlarged scale in FIG. 5. As can be seen from FIG. 5, the beveled surface 40 is joined to the main portion 36 through a tapered reduced-diameter portion 42, the diameter of which is reduced in a tapered fashion. Specifically, from the main portion 36 to the bottom surface 38, the needle bearing 32 is gradually reduced in diameter by the tapered reduced-diameter portion 42, and then relatively sharply reduced in diameter by the beveled surface 40. Stated otherwise, a diameter reducing rate, defined according to equation (1) shown below, is greater at the beveled surface 40 than at the tapered reduced-diameter portion 42.

Diameter reducing rate=(the diameter of a start region−the diameter of an end region)/(the distance from the start region to the end region)×100 (1)

Figure 6:
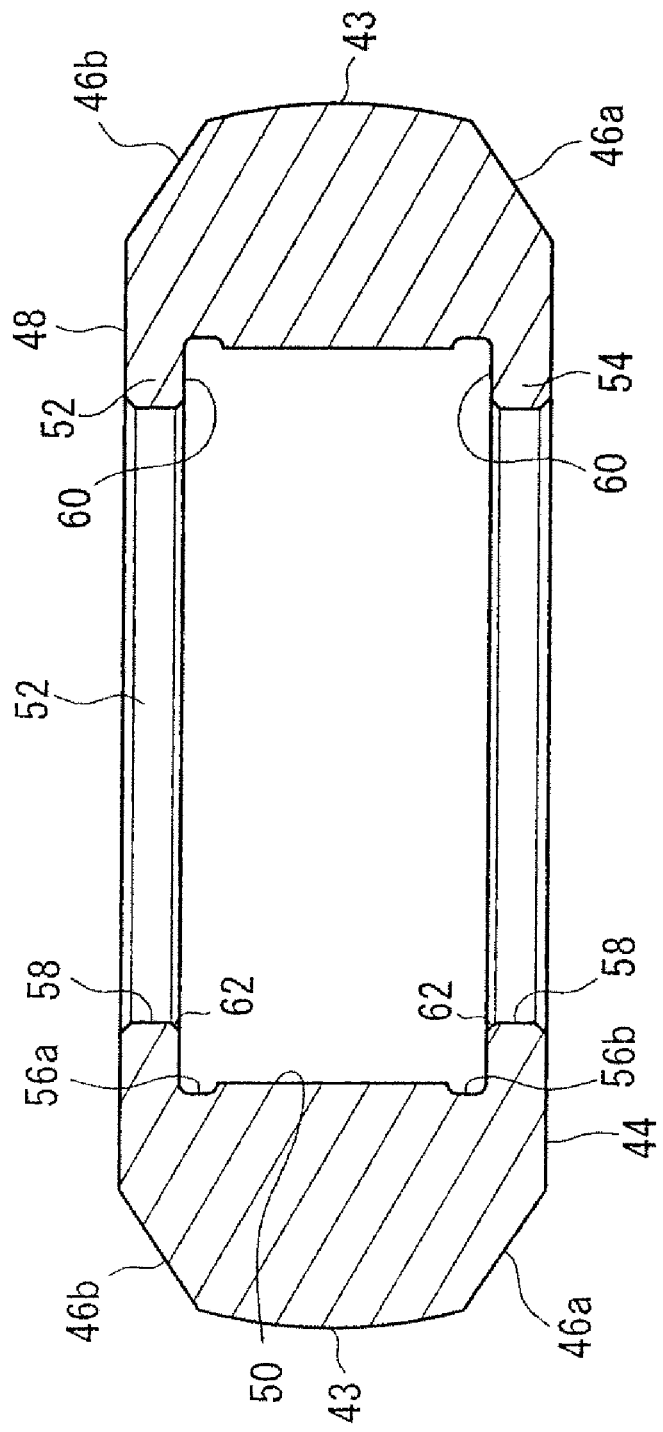
FIG. 6 is a schematic overall vertical cross-sectional view of a roller member shown in FIG. 3.

As shown in FIG. 6, the roller 34 has an outer circumferential surface, including an arcuate surface 43 which is complementary in shape to the cross-sectional shape of the side walls 26 for facilitating face-to-face contact with the side walls 26, a first annular slanted surface 46a contiguous from the arcuate surface 43 to a first surface 44, and a second annular slanted surface 46b contiguous from the arcuate surface 43 to a second surface 48.

The roller 34 has an inside-diameter portion 50 on an inner circumference thereof, which has a constant diameter and functions as a rolling surface for the needle bearings 32 to roll on. The inside-diameter portion 50 has an annular first flange 52 and an annular second flange 54 that are integral therewith, which project a predetermined length radially inward from upper and lower portions of the inside-diameter portion 50. The needle bearings 32 mounted on the inside-diameter portion 50 of the roller 34 are vertically held by the first flange 52 and the second flange 54, and thus are prevented from becoming separated and dislodged from the inside-diameter portion 50.

Annular grooves 56a, 56b are defined at boundaries between the inside-diameter portion 50 and the first and second flanges 52, 54. The annular grooves 56a, 56b function as lubricant reservoirs for holding a lubricant, such as grease or the like, when the inside-diameter portion 50 is coated with a lubricant (grease).

The first flange 52 and the second flange 54 have respective inner circumferential surfaces 58 on radially inner ends thereof, and respective inner surfaces 60 on inner walls thereof, for contact with end faces of the needle bearings 32. The first flange 52 and the second flange 54 include beveled surfaces 62 defined between the inner circumferential surfaces 58 and the inner surfaces 60.

The joint boot 20 (see FIG. 1) comprises a large-diameter tube 64 and a small-diameter tube 66 disposed on respective ends thereof, with a bellows 68 being interposed between the large-diameter tube 64 and the small-diameter tube 66. The large-diameter tube 64 is tightened around the end of the outer member 14 by a tightening band 70, and the small-diameter tube 66 is tightened around the second transmission shaft 16 by a tightening band 72, thereby fixing the joint boot 20 in position. Reference numerals 74, 76 represent crimped portions, which are produced when the tightening bands 70, 72 are crimped.

The tripod constant-velocity joint 10 according to the present embodiment is basically constructed as described above. Operations and advantages of the tripod constant-velocity joint 10 will be described below.

For constructing the drive force transmitting mechanism, the needle bearings 32 are assembled into the rollers 34 by means of a keystone process.

Figure 7:
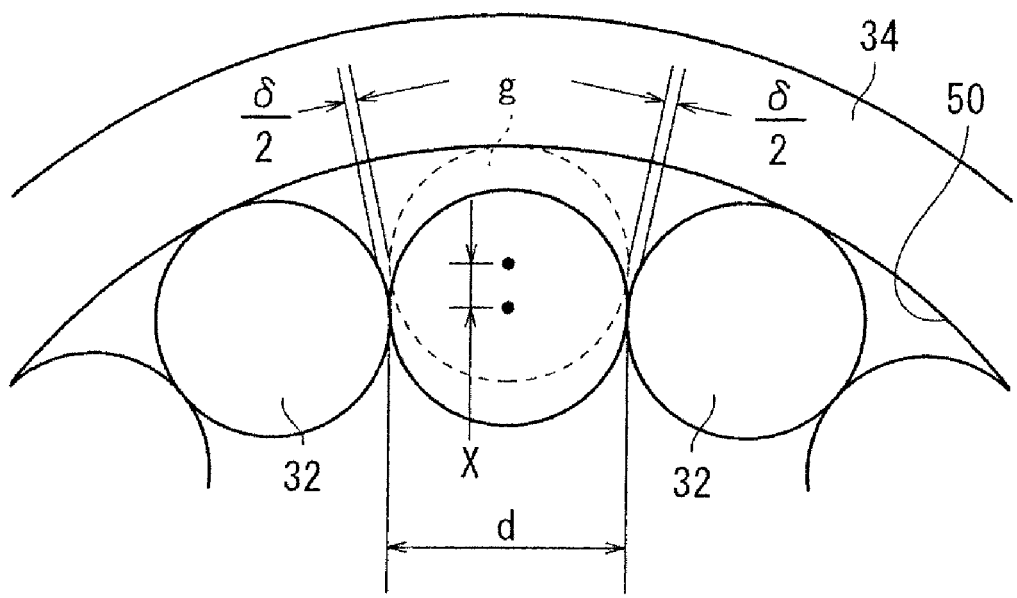
FIG. 7 is a partial cross-sectional view showing a distance by which the needle bearing assembled by a keystone process is radially displaced.

Such a keystone process, as referred to above, is a process by which the needle bearings 32 are arrayed along the inside-diameter portion 50 of the roller 34. According to the keystone process, as shown in FIG. 7, a plurality of needle bearings 32, which are one needle bearing less than the total number of needle bearings 32, are placed in contact with each other on the inside-diameter portion 50 as an array, as shown in FIG. 7. Then, a final needle bearing 32 is pressed into a gap g formed between two of the needle bearings 32 on opposite ends of the array of needle bearings 32.

The (final) needle bearing 32 has an outside diameter Dn, which is several μm to several tens μm greater than the distance d by which the needle bearings 32 are spaced from each other across the gap g. Therefore, when the final needle bearing 32 is pressed into the gap g, all of the needle bearings 32 become neatly arrayed along the inside-diameter portion 50 and are tentatively held in position by mutual interfering engagement, whereupon the needle bearings 32 are prevented from radially inward displacement (toward the center of the roller 34).

Figure 8:
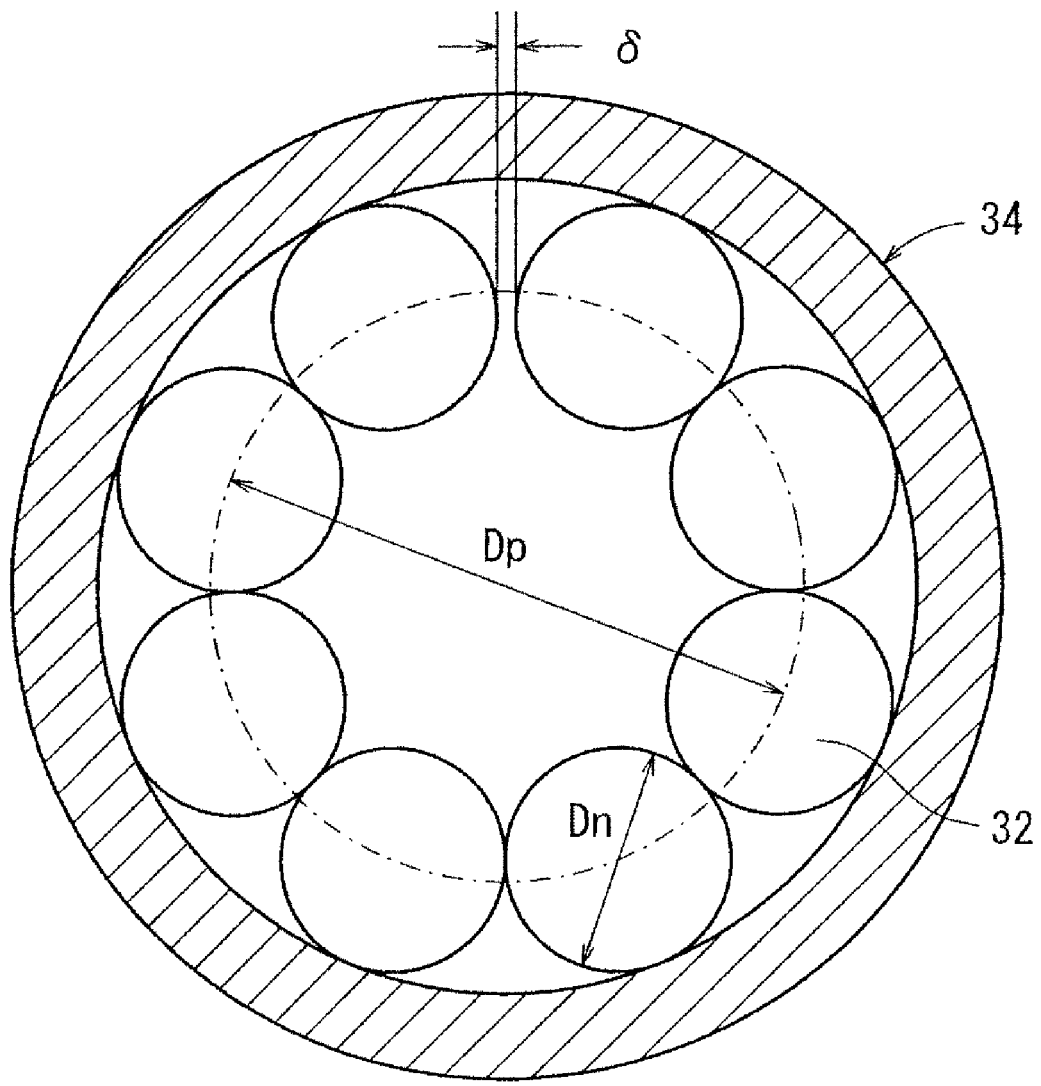
FIG. 8 is a partial cross-sectional view illustrating a circumferential gap δ.

While the needle bearings 32 are tentatively held against the inside-diameter portion 50 by the aforementioned keystone process, all of the needle bearings 32 except for one needle bearing 32 are held in contact with the inside-diameter portion 50. Only the excluded needle bearing 32 is movable radially. The excluded needle bearing 32 is movable radially by a distance X (see FIG. 7) because of a circumferential gap δ (see FIG. 8). However, the excluded needle bearing 32 is not capable of moving from between the adjacent needle bearings 32, 32 toward the center of the roller 34.

The circumferential gap δ is expressed according to the following equation (2):

$$\delta = Dp \cdot \sin\{(Z-1)\sin^{-1}(Dn/Dp)\} - Dn \quad (2)$$

where δ represents the gap between two final rolling bodies when all of the needle bearings 32 are arranged as a gap-free array along the inside-diameter portion 32 of the roller 34, Dp represents the diameter of a pitch circle drawn by interconnecting the centers of the needle bearings 32, Dn represents the outside diameter of each of the needle bearings 32, and Z represents the number of needle bearings 32.

Figure 9:
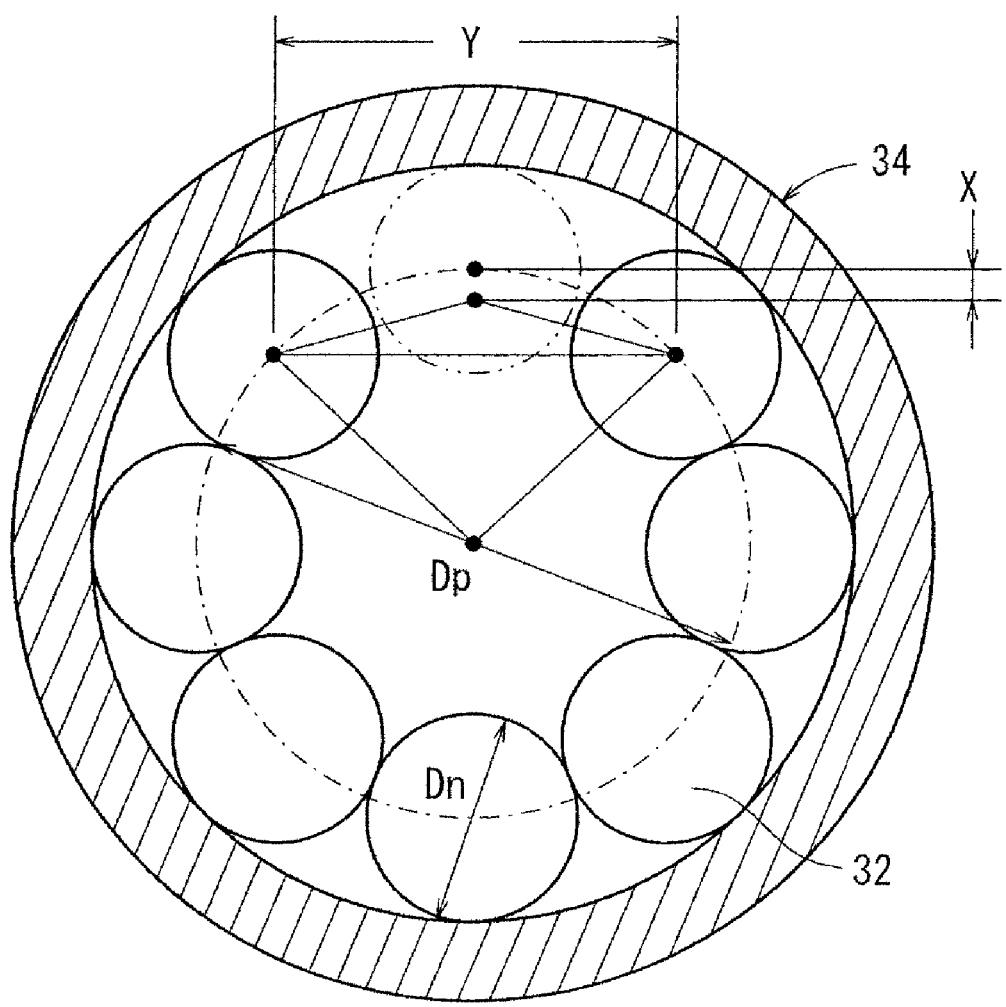
FIG. 9 is a partial cross-sectional view illustrating a distance X by which the needle bearing is radially displaced.

When all of the needle bearings 32 are arranged as a gap-free array along the inside-diameter portion 50 of the roller 34, as shown in FIG. 9, the distance Y between centers of the needle bearings 32, which are positioned adjacent to the inwardly pressed final needle bearing 32, is expressed according to the following equation (3):

$$Y = Dp \cdot \sin\{(Z-2)\sin^{-1}(Dn/Dp)\} \quad (3)$$

Therefore, the distance X by which the needle bearing 32 is allowed to move radially of the roller 34 by the circumferential gap δ is expressed by the following equation (4):

$$X = \frac{1}{2}\{Dp - [\sqrt{(4Dp^2 - Y^2)} + \sqrt{(Dp^2 - Y^2)}]\} \quad (4)$$

Figure 11:
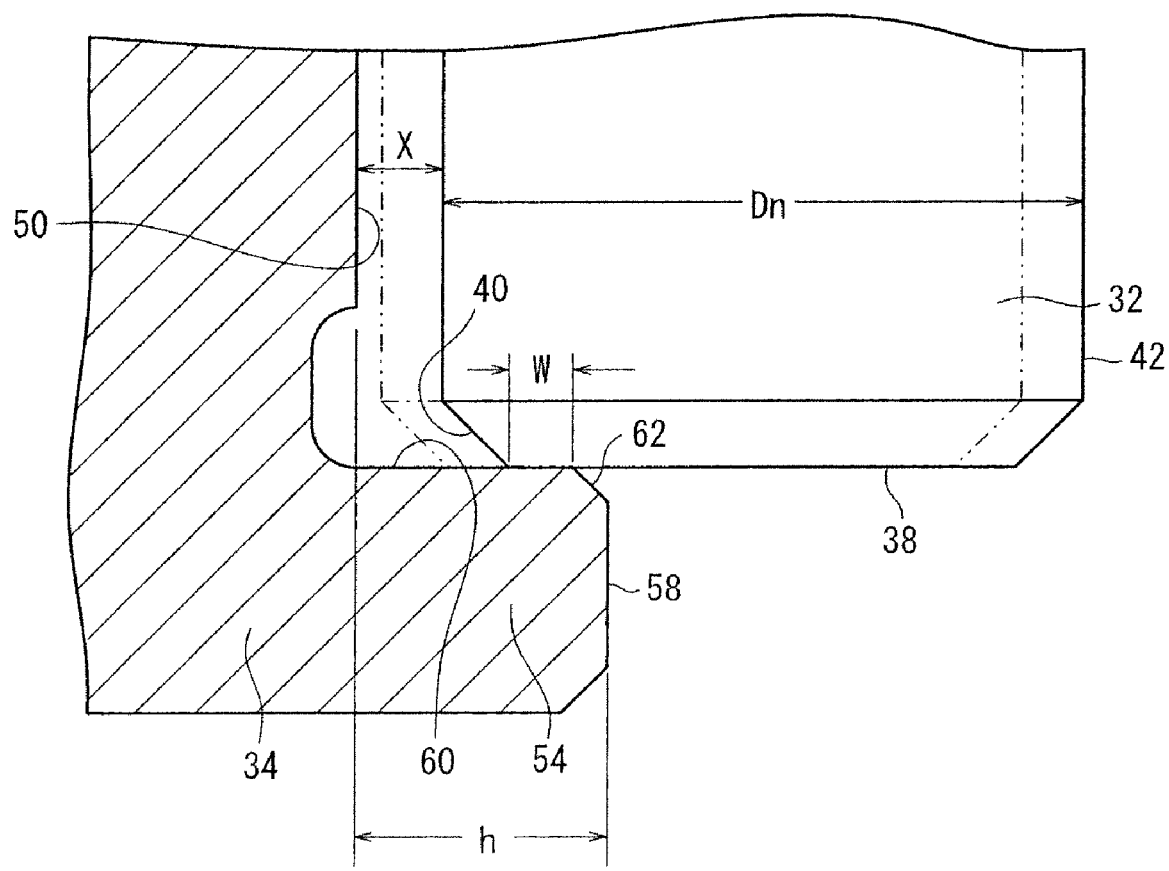
FIG. 11 is an enlarged partial vertical cross-sectional view showing a distance by which the needle bearing is radially displaced.

According to the present embodiment, assuming that the distance X is maximum, then the first flange 52 (the second flange 44) is set to a height h such that the ratio (W/Dn) of the outside diameter Dn of the needle bearing 32 to the width of contact W lies within a range from 0 to 0.3. Stated otherwise, the percentage produced by multiplying the value of W/Dn by 100 is within a range from 0% to 30%, as shown in FIG. 10. Also, as shown in FIG. 11, the width of contact W refers to a horizontal width of contact between the inner surfaces 60 of the second flange 54 (the first flange 52) of the roller 34 and the bottom surface (flat end face) 38 of each of the needle bearings 32.

According to the present embodiment, when the ratio (W/Dn) of the outside diameter Dn of the needle bearing 32 to the width of contact W is set in a range from 0 to 0.3, the depth of a groove for holding the needle bearing 32, which is defined between the first and second flanges 52, 54 of the roller 34, is reduced, thus allowing the first and second flanges 52, 54 to be machined with ease, and also allowing the needle bearings 32 to be assembled with ease. Also, resistance to rotation of the needle bearings 32 is reduced. Furthermore, the contact pressure between the needle bearings 32 and the inner walls of the roller 34 is lowered, thereby increasing the durability of the needle bearings 32 and the roller 34.

Inasmuch as the bottom surfaces of the needle bearings 32 are formed as flat surfaces, the bottom surfaces of the needle bearings 32 and the inner surfaces 60 of the roller 34 are held in face-to-face contact with each other, thus resulting in reduced surface pressure.

The needle bearings 32 have tapered reduced-diameter portions 42 (see FIG. 5). Therefore, the area of contact between adjacent needle bearings 32, the area of contact between the needle bearings 32 and the inside-diameter portions 50, and the area of contact between the needle bearings 32 and the trunnions 30a through 30c are small. This results from the fact that, even when the main portions 36, 36 of adjacent needle bearings 32, 32 are brought into abutment against each other, for example, the tapered reduced-diameter portions 42 are spaced from each other.

When the second transmission shaft 16 is displaced in the bottomed tubular member 12, thus causing the rollers 34 to rotate in the above-described state, the area of sliding contact between adjacent needle bearings 32, the area of sliding contact between the needle bearings 32 and the inside-diameter portions 50, and the area of sliding contact between the needle bearings 32 and the trunnions 30a through 30c are small. Consequently, the needle bearings 32 are prevented from becoming worn.

According to the present embodiment, as described above, it is easy to assemble the tripod constant-velocity joint 10, and the needle bearings 32 thereof are maintained free of undue wear.

The distance X by which the needle bearing 32 moves radially of the roller 34 based on the circumferential gap 6 represents the maximum distance at which the needle bearing 32 moves radially (see FIGS. 7 and 11). While maintaining the width of contact W and the maximum distance X that the needle bearing 32 moves, a suitable value for the height h of the first flange 52 and the second flange 54 can be assured.

In FIG. 10, the mark "○" indicates that the characteristic is preferable, whereas the mark "Δ" indicates that the characteristic is not preferable. The results shown in FIG. 10 were determined by way of experimentation and simulation.

The invention claimed is:
1. A tripod constant-velocity joint having a tubular outer member including three guide grooves defined in an inner wall thereof, the guide grooves being spaced a predetermined distance from each other and extending in axial directions, the tubular outer member being coupled to a first transmission shaft, and an inner member inserted in a hollow space inside the outer member and coupled to a second transmission shaft, comprising:
a plurality of trunnions disposed on the inner member and projecting into the guide grooves;

rollers having outer circumferential surfaces held in contact with side walls of the guide grooves of the outer member, the rollers being rotatable along the side walls; and a plurality of rolling bodies having flat bottom surfaces and interposed between the rollers and the trunnions, wherein each of the rolling bodies has a tapered reduced-diameter portion and a beveled surface, which are interposed between a constant-diameter main portion and the bottom surface, the beveled surface having a greater diameter reducing rate than the tapered reduced-diameter portion.

2. A tripod constant-velocity joint according to claim 1, wherein a ratio of an outside diameter of the rolling bodies to a width of contact (W) between a rolling body holder of each of the rollers and an end face of each of the rolling bodies is set to a value ranging from 0 to 0.3.

* * * * *